United States Patent [19]

Kyster et al.

[11] 4,432,270
[45] Feb. 21, 1984

[54] HYDROSTATIC CONTROL DEVICE PARTICULARLY A STEERING DEVICE

[75] Inventors: Erik Kyster, Augustenborg; Svend E. Thomsen, Nordborg, both of Denmark

[73] Assignee: Danfoss A/S, Nordborg, Denmark

[21] Appl. No.: 261,595

[22] Filed: May 7, 1981

[30] Foreign Application Priority Data

May 16, 1980 [DE] Fed. Rep. of Germany ....... 3018792

[51] Int. Cl.³ ............................................. F15B 15/18
[52] U.S. Cl. ....................................... 91/436; 60/384; 60/386; 60/405
[58] Field of Search ..................... 91/436; 60/384, 405, 60/386, 461; 180/132

[56] References Cited

U.S. PATENT DOCUMENTS

| | | | |
|---|---|---|---|
| 3,436,915 | 4/1969 | Mercier | 60/386 |
| 3,971,214 | 7/1976 | Mercier | 60/386 |
| 3,978,879 | 9/1976 | Termansen et al. | 91/436 |
| 4,043,419 | 8/1977 | Larson et al. | 60/384 |
| 4,079,805 | 3/1978 | Rau | 180/132 |
| 4,221,159 | 9/1980 | Liebert | 60/384 |
| 4,253,540 | 3/1981 | Berg | 60/384 |
| 4,297,845 | 11/1981 | Kyster | 60/384 |
| 4,372,413 | 2/1983 | Petersen et al. | 60/384 |

Primary Examiner—Robert E. Garrett
Assistant Examiner—Richard L. Klein
Attorney, Agent, or Firm—Wayne B. Easton

[57] ABSTRACT

The invention relates to a steering control system for a bidirectional servomotor connectable to steerable wheels. The servomotor may be of the differential type in which a rod extending from one side of the piston thereof causes the effective areas on opposite sides of the piston to be unequal. A steering control unit controlled by a steering wheel has two motor ports connected to opposite sides of the servomotor and pump and tank ports connected to pump and tank units. The steering control unit has a metering motor controlled by the steering wheel which meters fluid to and away from only one side of the servomotor. The steering control unit has oppositely acting valves which may be throttle valves for establishing flow paths for opposite steering directions and the neutral condition.

1 Claim, 1 Drawing Figure

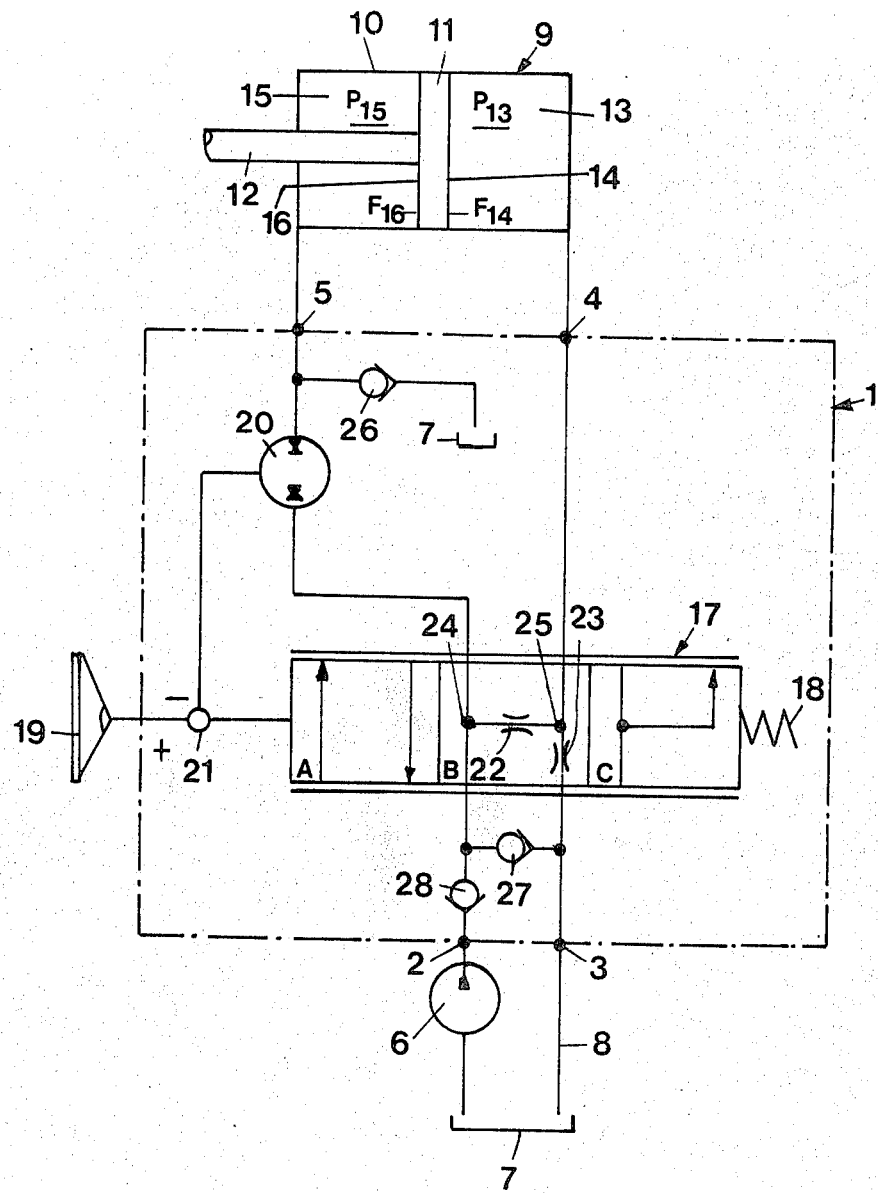

HYDROSTATIC CONTROL DEVICE PARTICULARLY A STEERING DEVICE

The invention relates to a hydrostatic control device, particularly a steering device, for driving in both directions a servo-motor having a differential piston which sub-divides the cylinder into a first operating chamber of larger pressure area and a second operating chamber of smaller pressure area, comprising a pump connection, a tank connection, a first motor connection for the first operating chamber and a second motor connection for the second operating chamber, a control element such as a steering wheel, a measuring motor connectable in series to the servo-motor, and a control valve which is adjustable by the control element and resettable by the measuring motor and has a neutral position as well as two operating positions, wherein in the one operating position the first motor connection is connected to the tank connection and the second motor connection to the pump connection, in the other operating position both motor connections are connected to each other and to the pump connection, and in the neutral position both motor connections are interconnected by way of the measuring motor.

In a known control device of this kind (U.S. Pat. No. 3,971,214), the differential piston must have an area ratio of 1:2 so that, when turning left and turning right, a respective one rotation of the steering wheel will correspond to the same adjusting motion. The control valve is a switching valve which is actuatable depending on the direction, in the neutral position blocks the supply from the pump to the servo-motor and the return flow from the servo-motor to the tank and, on actuation switches the measuring motor so that it is always disposed on the supply side of the servo-motor. This results in lost motion in the vicinity of the neutral position. The control element must each time be turned through a certain angle out of the neutral position until a connection is established between the pump and servo-motor because, for the purpose of an adequate seal in the neutral position, a certain minimum distance is required. In one embodiment, both motor connections are interconnected by way of the measuring motor in the neutral position so that, under the influence of an external force, pressure medium can theoretically flow through the measuring motor from one operating chamber to the other whereby a reaction effect could be established. However, this is impossible in practice because of the differing quantities of the pressure fluid to be compressed on the one hand and to be received on the other hand.

The invention is based on the problem of providing a hydrostatic control device with a differential piston of the forementioned kind, wherein the ratio of the pressure areas of the differential piston is freely selectable.

This problem is solved according to the invention in that the control valve comprises two series-connected throttles which are disposed between the pump connection and tank connection and change in opposite senses upon adjustment, that the starting point of the series circuit is permanently connected to the second motor connection by way of the measuring motor and the junction of the throttles is permanently connected to the first motor connection, and that the throttles are designed so that in the neutral position the ratio of the input pressure of the series circuit to the pressure at the junction is equal to the ratio of the larger pressure area to the smaller pressure area of the servo-motor. In this construction, the pump pressure sets itself in accordance with the load on the servo-motor. The pressure at the junction is lower in proportion to the throttle resistances. The throttle resistances are selected so that in the neutral position there is force equilibrium (larger pressure area x smaller pressure smaller pressure area x larger pressure), i.e. the servo-motor is stationary. The manner of operation applies to any desired ratios of the pressure areas of the differential piston. It is merely necessary to adapt the throttles accordingly or to displace the neutral position of the control valve accordingly. Since an adjustment of the control element immediately leads to a change in the pressure at the junction and thus to a change of the forces acting on the differential piston, the servo-motor is adjusted without any lost motion. Since it is not necessary to adjust the measuring motor, the construction of the control valve is also simpler. Since the measuring motor is always associated with the operating chamber having the smaller pressure area, it is only the pressure medium flowing to and away from this chamber that is measured so that it is immaterial what proportion has to be delivered by the pump into the operating chamber of larger pressure area. If an external force acts on the servo-motor, pressure medium can pass from one operating chamber to the other, it being possible for the excess quantity of larger pressure area to be fed from the pump by way of the first throttle in the one actuating direction and led away to the tank through the second throttle in the other actuating direction. In both cases, there are clear influences on the measuring motor, by which the control valve and thus the throttles are so adjusted that the external force is opposed by a higher pressure. At the same time, this adjustment of the control valve also causes the control element to be loaded through the neutral position spring that is usually provided, so that the operator will sense the external force and can take counter-steering measures by appropriately actuating the control element. Since the servo-motor responds immediately upon actuation of the control element and, conversely, the operator immediately reacts to an undesirable adjustment of the servo-motor, the hydrostatic control device is also suitable for installation in more rapidly travelling vehicles.

In one preferred embodiment, in which the measuring motor is entrainable by the control element as an emergency pump, it is advisable for at least the side of the measuring motor facing the second motor connection to be connected to the tank connection by way of a check valve opening towards the motor. This check valve permits the emergency pump to suck in the excess quantity required to fill the operating chamber of larger pressure area. However, it is also possible to provide such a check valve on the other side of the measuring motor, which permits the suction side of the emergency pump to be connected to the tank while the control valve is bypassed.

In a further embodiment, the pump connection may be followed by a check valve opening away from it. The blocking effect improves the efficiency during emergency operation if the failed pump itself is not entirely sealed.

The invention will now be described in more detail with reference to a preferred example illustrated in the drawing, wherein the illustrated block diagram shows a control device according to the invention.

A control device 1 comprises a pump connection 2, a tank connection 3, a first motor connection 4 and a second motor connection 5. A compression pump 6 of conventional construction for sucking pressure fluid from a tank 7 is connected to the pump connection 2. The tank is connected to the tank connection 3 by a conduit 8. A servo-motor 9 comprises a differential piston 11 adjustable in a cylinder 10 and having a piston rod 12 which, for example, can adjust the wheels of a vehicle that is to be steered. The piston separates a first operating chamber 13 connected to the first motor connection 4 and facing the end 14 of larger pressure area F14 from a second operating chamber 15 which is connected to the second motor connection 5 and faces the end face 16 having the smaller pressure area F16.

The control device comprises a control valve 17 which is held in the neutral position B by a neutral position spring 18, can be set to one of the operating positions A or C by a control element 19 in the form of a steering wheel, and is resettable by a measuring motor 20, which is indicated by a comparator 21. In practice, the control valve 17 can for example comprise two concentric rotary slide sleeves of which one is connected to the control element 19 and the other to the rotor of the measuring motor 20, as is known for other valve functions such as from DE-PS No. 12 93 029. The neutral position spring 18 is formed by leaf springs passing through both sleeves.

The control valve comprises a series circuit of two throttles 22 and 23 which change in opposite senses upon adjustment. The starting point 24 of the series circuit is connected on the one hand to the pump connection 2 by way of a check valve 28 and on the other hand to the second motor connection 5 by way of the measuring motor 20. The end of the series circuit is connected to the tank connection 3. The junction 25 of the throttles 22 and 23 leads to the first motor connection 4.

In addition, one side of the measuring motor 20 is connected to the tank 7 by way of a check valve 26 and the other side by way of a check valve 27.

The manner of operation is as follows. In the neutral position, the pressure P15 obtains in the second operating chamber 15 and corresponds to the pressure of the pump 6 and the pressure at the starting point 24. The pressure P13 obtains in the operating chamber 13 and corresponds to the pressure at the junction 25. The throttles are designed so that in the neutral position this pressure P13 has a value such that the pressure ratio P15:P13 is equal to the ratio of the pressure areas F14:F16. The differential piston 11 therefore remains at rest.

If the control valve 17 is continuously moved into the operating position A by turning the steering element 19, the resistance of the throttle 22 increases whilst the resistance of the throttle 23 is reduced. Consequently, the pressure P13 drops because the pressure P15 rises, and the differential piston 11 moves to the right because the force in the operating chamber 15 has become larger than the force in the operating chamber 13. If resistances are to be overcome, the pressure of the pump 6 rises and the pressure P15 in the operating chamber 15 rises correspondingly whereas the pressure P13 is reduced. In the end position of the operating position A, the throttle 22 is blocked and the throttle 23 is fully open as is indicated diagrammatically. If the control valve 17 is adjusted in the opposite direction, the resistance of the throttle 22 drops whereas the resistance of the throttle 23 increases. Consequently, the pressure P13 rises and the differential piston 11 moves to the left. Here, again, the pressure of the pump 6 could rise because of a load on the servo-motor, whereby the pressure P13 rises accordingly. In the end position, the throttle 23 is closed and the throttle 22 fully open as is diagrammatically indicated.

If an external force acts on the differential piston from the right-hand side, pressure fluid is pressed out of the operating chamber 15 through the measuring motor 20 and the throttle 22 into the operating chamber 13. The missing amount of liquid can be replenished by suction from the junction 25. The rotor of the measuring motor 20 therefore moves and so adjusts the control valve 17 that the pressure P13 drops and the pressure P15 rises and thus counteracts the external force. Since the motion of the rotor can also be felt at the control element 19 by way of the neutral position spring 18, the person steering a vehicle may also manually steer in the opposite direction. The same applies if the external force acts on the differential piston 11 from the left-hand side. This reaction behaviour exists in the neutral position as well as in the operating positions.

During emergency operation when the pump 6 has failed, adjustment may take place with the aid of the measuring motor 20 which now operates as an emergency pump drivable by means of the control element 19. If it is desired to adjust the servo-motor 11 towards the right-hand side, the measuring motor 20 sucks pressure fluid through the check valve 27 from the chamber 13 and feeds it into the operating chamber 15. The excess liquid from the operating chamber 13 goes to the tank 7. If the servo-motor is to be displaced to the left, the measuring motor sucks pressure fluid from the operating chamber 15 and feeds it through the throttle 22 into the operating chamber 13. The additional amount of liquid required is sucked out of the tank 7 through the check valve 26.

On the whole, one therefore has a control device which operates extremely accurately because there is no lost motion during adjustment from the neutral position. This, in conjunction with the automatic reaction to external forces, leads to an extremely good directional stability. Kick backs and undesired entrainment by reason of external forces are avoided. Since the measuring motor is built into a fixed position, there are no switch over positions which are associated with leakage losses, detrimentally influence the operatng accuracy and give rise to slip between the adjustment of the control element and the actual adjustment of the servo-motor 11.

What is claimed is:

1. A hydraulic steering control system, comprising, a differential type bidirectional servomotor having a piston with rod and nonrod sides forming smaller and larger effective areas, said servomotor having rod side and nonrod side ports on opposite sides thereof, pump means and tank means, steering control means connected between said servomotor on one side thereof and said pump and tank means on the other side thereof, said steering control means including first and second throttle valve means extending in series between said pump means and said tank means, a control element for said steering control means, said valve means being oppositely operable between opened and closed positions responsive to movement of said control element, directionally operable metering motor means connected to said rod side port of said servomotor and to the junction between said pump means and said first throttle valve means, said servomotor nonrod side port being connected to the junction between said first and second throttle valve means, said first and second throttle valve means having effective respective flow resistances related to the relative areas on the opposite sides of said servomotor piston to equalize the steering forces required to operate said servomotor.

* * * * *